April 4, 1967     C. L. GILMORE     3,312,362
TRANSPORT APPARATUS FOR WHEELED VEHICLE
Filed July 2, 1965     2 Sheets-Sheet 1
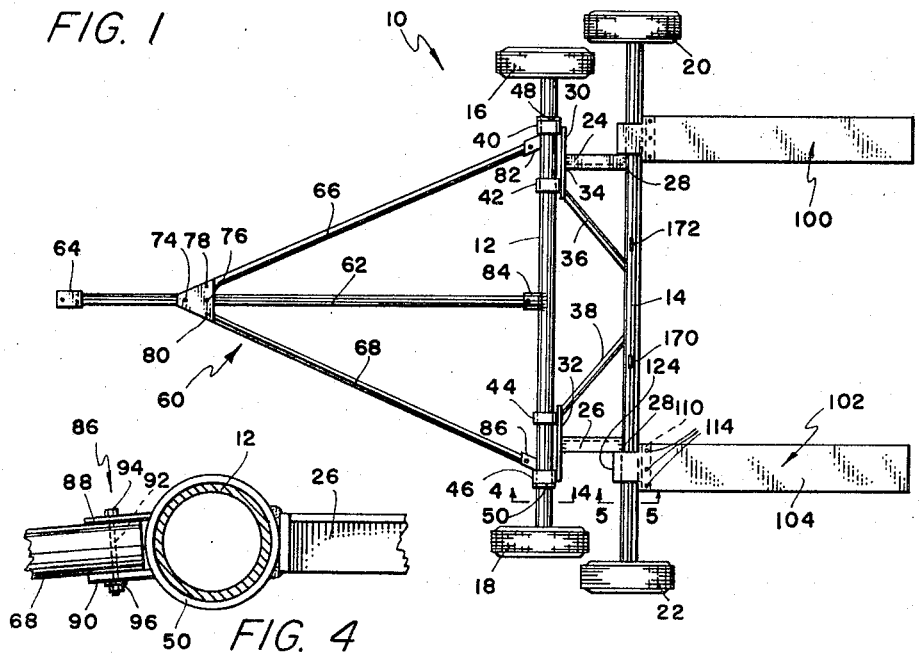
FIG. 1
FIG. 4
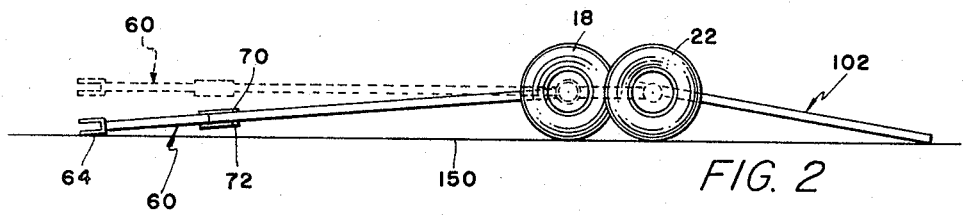
FIG. 2
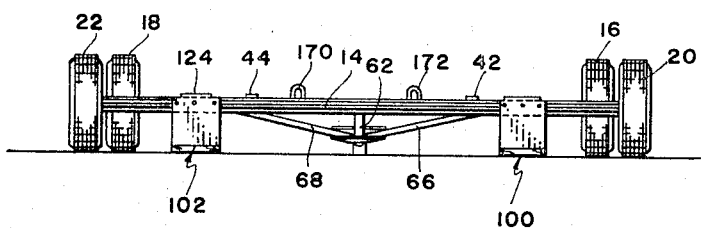
FIG. 3
FIG. 5
INVENTOR.
CHARLES L. GILMORE
BY
ATTORNEY April 4, 1967 C. L. GILMORE 3,312,362
TRANSPORT APPARATUS FOR WHEELED VEHICLE
Filed July 2, 1965 2 Sheets-Sheet 2

*INVENTOR.*
CHARLES L. GILMORE
BY
*Robert E. Breidenthal*
ATTORNEY

United States Patent Office 3,312,362
Patented Apr. 4, 1967

3,312,362
TRANSPORT APPARATUS FOR WHEELED
VEHICLE
Charles L. Gilmore, Sterling Township, Rice County, Kans., assignor to Ark Manufacturing Company, Inc., Sterling, Kans., a corporation of Kansas
Filed July 2, 1965, Ser. No. 469,239
11 Claims. (Cl. 214—334)

The present invention relates to new and useful improvements in transport apparatus, and more particularly pertains to a wheeled trailer construction and such wheeled trailer construction in combination with a wheeled machine partially supported on such trailer.

Numerous proposals have heretofore been made with respect to various forms of trailers, dollies, and trailers or dollies in combination with towing vehicles, hoists and the like for the purpose of facilitating the movement of various form of specialized, self-powered wheeled vehicles from one point of use to a remote point of use. Provision for facilitating such transport between points of use is either desirable from the standpoint of convenience, economy of time, or from the standpoint of saving unnecessary wear and tear on specialized equipment that is usually quite expensive. Such facilitation of transport is oftentimes mandatory either because the specialized machine is physically incapable of negotiating any available route between the points of use, or because of various legal requirements that might prevail with respect to any public road that must be used. The character of such legal requirements are many and varied as they may be applicable as to any particular form of self-powered specialized wheeled machine, and as well known may be exemplified by weight per axle limitations, minimum permissible speeds, load width, etc.

It has been found that each of the prior proposals heretofore made with respect to trailers that could conceivably be employed to facilitate a specialized wheeled machine such as a swather or wind rower, for example, is subject to one or more shortcomings that make pursuance of such proposals considerably less than satisfactory. For example, many of such proposals would involve in execution the investment of a substantial amount of capital in a piece of equipment of only highly specialized and thus very limited utility, with the result of one of the principal purposes of such equipment, namely, economy having been defeated or greatly impaired. Not only may such equipment be quite expensive, but oftentimes such proposals involve mechanisms of sufficient vulnerability to attack by the elements that either available shelter space must be devoted to or additional shelter space obtained to house the equipment when not in use, if excessively expensive deleterious consequences of exposure to weather is to be avoided.

Other shortcomings of prior art proposals are in the nature of it being either very difficult for one man or even in it being essential that two or more men being necessary in order to place the trailer and the specialized wheeled machine either into or from a transport condition. Many of the prior art proposals necessitate the trailer and the specialized wheeled machine being either changed into or changed from a transport condition at a site where specialized loading or unloading equipment is installed or available, this disadvantage being especially a nuisance as it oftentimes necessitates transporting specialized loading equipment along with the specialized wheeled machine so that the latter can be unloaded at its point of next use. Such transporting of the specialized loading equipment usually involves an entirely different packing or storage procedure to be followed in loading the specialized loading equipment after the wheeled machine has been placed in transport condition with respect to the trailer.

As a final disadvantage of prior art proposals to be specifically enumerated herein, many of the prior art proposals involve not only expensive and complex structure, but in addition such structures are heavy and bulky so that the cost thereof is even still further increased because of the shipping charges incurred in sending the same from the point of manufacture to the ultimate purchaser. This consideration also adversely affects resale values in tending to geographically limit any prospective market.

In view of the many disadvantages of prior art proposals as briefly suggested above, it is a primary object of this invention to provide an inexpensive trailer construction that is very simple and rugged for supporting the wheels of a machine having a common axis of rotation.

Another important object of the invention is to provide a trailer of the character indicated above wherein the trailer includes ramps whereby the wheels having a comomn axis of rotation to be carried by the trailer can be rolled up the ramp into the positions that they occupy during their transport on the trailer, such ramps being so constructed and arranged as to be moved automatically from and into their loading positions upon the wheels being moved into and from, respectively, the positions they occupy when transported by the trailer.

Still another important object of the invention is to provide a trailer of such construction that the same includes seats for receiving the wheels to be carried by the trailer when the wheels are in transport position, with such seats being comprised of a pair of trailer axles sufficiently closely spaced to serve this purpose.

Still another important object of the invention is to provide a trailer construction of the character specified above wherein the ramps can be readily disconnected from the other components of the trailer for a compact packaging or creating therewith for shipping purposes, and wherein the trailer tongue can be readily disconnected from other components of the trailer and collapsed for compact packaging for shipping purposes.

Still another purpose of the invention is to provide apparatus of the character specified above wherein the number of wheels having a common axis to be carried by the trailer is not limited to two wheels, and is not limited to such wheels that are able to directly engage the tread width of the ramps, as in the case of dual wheels having a common axle.

Important features of the invention reside in the provision of closely spaced axles of differing lengths in an arrangement such that the wheels rotatably mounted on such axles can have a diameter greater than the spacing of the axles.

Another important feature of the invention resides in the provision of means intermediate the longitudinal extent of the ramp for oscillatably supporting the ramp upon an axle, whereby the ramp tends to rock about the axle as an axis to an extent determined by the distribution and amount of loads carried thereby, it being preferred that the means for oscillatably supporting the ramp only partially embrace the axle so that the ramp can be readily detached from or positioned selectively along the length of the axle.

Still another important feature of the invention resides in the tongue being fixedly secured to the front axle, with the front axle being rotatably mounted, whereby such rotatable mounting of the front axle enables raising and lowering of the forward end of the tongue.

Still another important feature of the invention resides in the provision of a tongue construction wherein lateral members thereof can be collapsed against a central member with all such members being detached from the front axle to facilitate storage or packing the trailer for shipment.

Broadly, one aspect of the invention involves a transport trailer comprising elongated, parallelly spaced front and rear axles one of which is shorter than the other, whereby such axles are adapted to have rotatably mounted upon their ends wheels of a diameter greater than the spacing of the axles, a forwardly extending tongue secured to the front axle, and means enabling vertical oscillation of the tongue about the axis of the front axle. Preferably, such trailer according to the invention includes a pair of elongated ramps, and each of the ramps being provided intermediate its longitudinal extent with means for oscillatingly supporting such ramp upon the rear axle.

Yet another aspect of the invention involves for use in a wheeled vehicle of the type that is employed to transport a wheeled machine, the improvement comprising means defining a pair of horizontally spaced seats that are each at least in part compatible with downwardly convex arcs and adapted to receive supportingly thereon a pair of ground wheels of a machine to be transported, a pair of parallel ramps with said ramps being oscillatably mounted for oscillation about aligned horizontal axes respectively disposed immediately adjacent the seats and above the lowermost extent of said arcs, each of said ramps extending away from its horizontal axis and the seat immediately adjacent thereto and terminating in a free end that is movable on oscillation of the ramp from a ground engaging position in which the ramp is downwardly inclined to an elevated position, and ramp raising means fixed to each ramp and comprising an extension thereof projecting above the seat into said arc and responsive to a ground wheel being supportingly received in such seat to oscillate the ramp and move the free end of the latter from said ground engaging position to said elevated position, whereby the ground wheels of a machine to be transported can be rolled up the ramps and over the axes associated therewith to engage operatively the ramp raising means on movement of the ground wheels downwardly into the seats to raise the free ends of the ramps from their ground engaging positions to their elevated positions.

Still another aspect of the invention involves the combination of a wheeled vehicle and a transport trailer therefor, said wheeled vehicle comprising a frame supported by a pair of spaced power driven front ground wheels and a rear, swivelly mounted ground wheel, said transport trailer comprising elongated and parallel front and rear axles each having a pair of ground wheels rotatably mounted at its opposite ends, a forwardly extending towing tongue connected to the front axle, said axles being spaced an interval less than the diameter of the power driven ground wheels, and a pair of elongated ramps extending rearwardly of the rear axle with means intermediate the longitudinal extent of each of said ramps oscillatably supporting such ramp upon the rear axle for oscillation about the rear axle as an axis, whereby the wheeled vehicle can be driven forwardly with the power driven ground wheels advancing upon the ramps to a transport position of the wheeled vehicle wherein the power driven ground wheels overlie the space intermediate the axles and nestle downwardly between the axles to an extent limited by the spacing of the latter, with such wheels bearing downwardly agaist the ramps forwardly of the rear axle to hold the ramps rearwardly of the rear axle in a raised position, and wherein the swiveled ground wheel is disposed substantially rearwardly of the rear axle, with the result that the weight of the wheeled vehicle is carried by the swiveled wheel and the wheels of the transport trailer.

Other objects, aims, features and aspects of the invention will become obvious in the light of the ensuing description of a preferred embodiment of the invention, such description to be considered in conjunction with the accompanying drawings illustrative of such embodiment of the invention, wherein:

FIGURE 1 is a top plan view of the transport trailer with the ramps employed therewith and in position to assist in loading a wheeled machine upon the trailer;

FIGURE 2 is a side elevational view of the trailer shown in FIGURE 1, with hidden portions of the ramp and of the frame connecting the axles being shown in dashed outline, and with an alternative position occupied by the tongue being indicated in dashed outline;

FIGURE 3 is a rear elevational view of the structure shown in FIGURES 1 and 2;

FIGURE 4 is an enlarged vertical sectional detail view taken upon the plane of the section line 4—4 in FIGURE 1;

FIGURE 5 is an enlarged sectional detail view taken upon the plane of the section line 5—5 in FIGURE 1;

Figure 6:
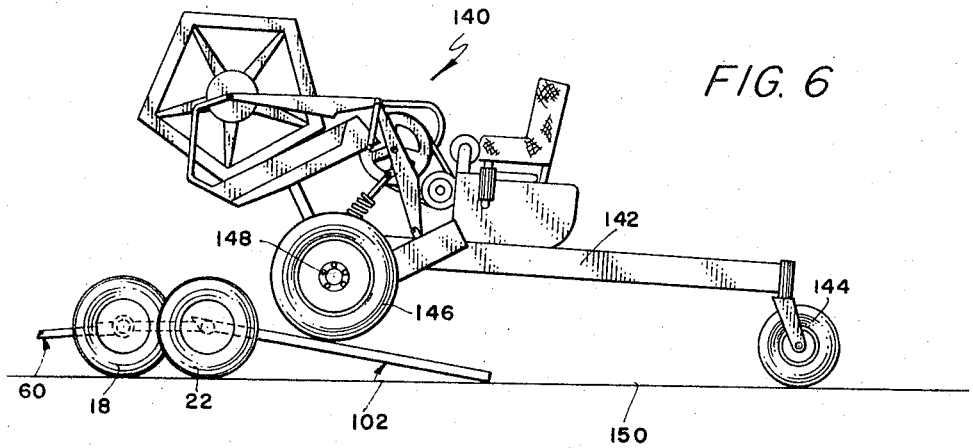
FIGURE 6 is a side elevational view illustrating relative positions occupied by the transport trailer and a swather as the latter rests upon the ramps as during a loading or unloading of the swather from the transport trailer.
Figure 7:
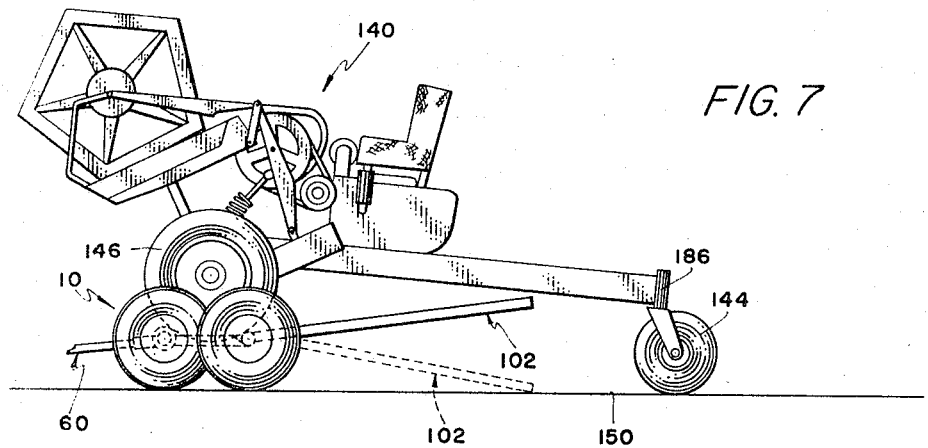
Figure 8:
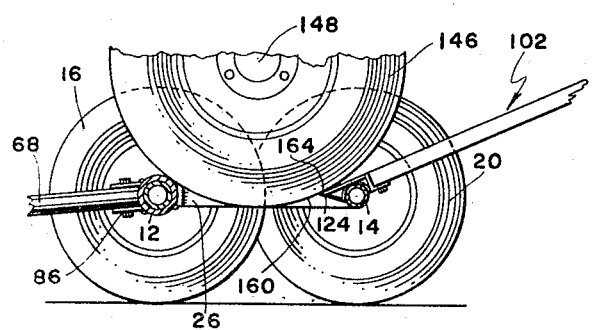

FIGURE 7 illustrates the relative positions occupied by the transport trailer and the swather shown in FIGURE 6 after the swather has moved from the position shown thereof in FIGURE 6 to its transport position with the power driven ground wheels thereof fully nestled between and resting upon the axles of the transport trailer, the position of the ramps in the transport condition being shown in full line and the position of such ramps during the loading and unloading operation being shown in dashed outline; and, FIGURE 8 is an enlarged vertical sectional detail view illustrating the relationship of a ground support wheel of the transported vehicle to the axles of the trailer and of the ramp when the structure is in transport condition.

Referring now to the drawings, wherein like numerals designate like parts throughout the various views, the reference numeral 10 designates the transport trailer of this invention generally. The trailer 10 comprises front and rear tubular steel frame members or axles 12 and 14, the latter being substantially longer than the former as clearly shown in FIGURE 1 whereby ground support wheels 16 and 18 conventionally mounted for rotation on the free or opposite ends of the axle 12 radially overlap and lie between ground support wheels 20 and 22 that are similarly and conventionally mounted for rotation upon the free or opposite ends of the axle 14.

Such arrangement of the axles 12 and 14 and relative positioning of the ground support wheels 16 through 22 enables very close spacing of the axles 12 and 14 particularly when the diameter of the wheels 16 through 22 is equal to or even greater than, as is preferred, the spacing between the horizontal and coplanar axles 12 and 14.

A pair of elongated frame members 24 and 26, preferably in the form of structural steel angle stock have their rear ends rigidly and fixedly attached to the axle 14 at spaced positions as by welding or the like 28. The frame members 24 and 26 are parallel and horizontally disposed and have rigidly attached to their forward ends vertical steel plates 30 and 32, respectively, as by welding or the like 34, and such steel plates 30 and 32 are further rigidified and reinforced by means of steel angle braces 36 and 38 which have their forward ends welded respectively to the adjacent ends of the plates 30 and 32, and their rear ends welded to the axle 14. It will be noted that the braces 36 and 38 are rearwardly convergent so as to be attached to the axle 14 adjacent the midpoint of the latter.

At spaced positions, the steel plate 30 has short pieces of steel tubing or hollow sleeve bearings 40 and 42 rigidly attached thereto in any suitable manner such as welding or the like. The short links of tubing or hollow sleeve bearings have horizontally aligned axes, and the axle 12 is journaled therethrough for rotation or at least oscillation therein. In a similar manner, the steel plate 32 is provided with hollow sleeve bearings 44 and 46, and the axle 12 is journaled or mounted for oscillation through such bearings 44 and 46. Annular steel stops or collars 48 and 50 are secured about the axle 12 as by welding or the like, such stops or collars 48 and 50 being respectively disposed at and in sliding engagement with the remote faces of the sleeve bearings 40 and 46, the arrangement being such that endwise movement of the axle 12 through the bearings 40, 42, 44, and 46 is prevented, though of course the axle 12 is free to rotate or at least oscillate in such bearings.

A collapsible and detachable tongue construction is designated generally at 60, such tongue construction comprising an elongated central member 62, the same preferably being made of tubular steel, such central member 62 being provided with any suitable conventional means for detachable securance to a trailer hitch (not shown) of any conventional towing vehicle such as a truck, automobile, tractor or the like. The means provided at the forward end of the central member 62 for detachable connection to a trailer hitch or other coupling device can, by way of example, be a clevis such as shown at 64.

A pair of lateral members 66 and 68 are disposed on opposite sides of the central member 62 and are coplanar therewith, such lateral members 66 and 68 having their forward ends pivotally connected to the central member 62 at a position adjacent the forward end of the latter. Such pivotal connection of the lateral members 66 and 68, such lateral members 66 and 68 also preferably being of tubular steel stock, is by means of the forward ends of the members 66 and 68 being received between vertically spaced, generally triangularly shaped steel plates 70 and 72 disposed on the top and bottom sides of the member 62 and being rigidly attached thereto by means of rivets or bolts 74 and 76 extending through such assembly. Pivot pins 78 and 80, preferably in the form of rivets or bolts provided with nuts extend through aligned openings in the plates 70 and 72 and the forward ends of the lateral members 66 and 68 respectively, whereby the lateral members 66 and 68 can be swung from the positions shown thereof in FIGURE 1 to a collapsed condition wherein they are substantially parallel to and flush against the opposite sides of the central member 62.

Spaced means 82, 84, and 86 are respectively provided along the longitudinally extent of the axle 12 for releasably securing the rear ends of the members 66, 62 and 68 to the axle 12. Since each of the means 82, 84 and 86 are essentially the same in character, a detailed description of the means 86 for releasably securing the rear end of the lateral member 68 to the axle 12 will suffice for the means 82 and 84 also. Referring specifically to FIGURE 4, it will be seen that the means 86 comprises a pair of vertically spaced steel ears 88 and 90 fixedly secured as by welding or the like to the axle 12, with the rear end of the lateral member 68 being snugly though removably received between such ears 88 and 90. The ears 88 and 90 and the member 68 are provided with aligned openings 92 therethrough, and the lateral member 68 is releasably retained in such position by means of a bolt or pin 94 extending through such openings 92 and being preferably retained against inadvertent dislodgment by means of a nut 96 threaded on the bolt 94.

As explained previously, the rear ends of all of the members 62, 66 and 68 are releasably secured to the axle 12 in the manner shown in FIGURE 4 in connection with the member 68, and the result of such structure is that the attachment of the members 66, 62 and 68 to the axle 12 retains the tongue construction 60 and its extended and operative condition such as shown in FIGURE 1; however, the members 66, 62 and 68 can be detached from the axle 12 by removal of the various pins or bolts associated with the means 82, 84 and 86, whereupon the tongue construction 60 can be collapsed as previously explained.

A pair of elongated ramps 100 and 102 are provided, whereby, as will be subsequently explained, the ground support wheels of a vehicle to be transported can be placed in the transport condition on the trailer 10. The ramps 100 and 102 are identical and a detailed description of one of such ramps will suffice for both. Accordingly, reference is made to FIGURE 5 for an appreciation of the means provided intermediate the ends of the ramp 102 for oscillatably supporting the ramp 102 upon the axle 14 for oscillation about the axis of the axle 14. As will be seen in the drawings, the ramp 102 is preferably comprised of an elongated and sturdy wooden plank 104, though of course any suitable material can, as will be appreciated by those skilled in the art, be employed in lieu of wood (such as, for example, channel iron), as is often employed for ramps in conjunction with the large trailers commercially employed to transport a plurality of passenger automobiles. As clearly seen in FIGURE 5, the longitudinal extent of the ramp 102 is greater than that of the wooden board or plank 104 and additionally includes in its extent a steel plate 106 having an upper surface constituting an extension of the upper surface of the plank 104. The steel plate 106 which need not be of as great width as the plank 106 (though, of course, it can if desired have a width equal to or greater than the transverse width of the plank 104), is attached to the forward end of the plank 104 by means of a steel angle that includes legs 108 and 110. The plate 106 is connected to the free edge of the leg 108 by means of welding 112, and the angle is secured to the plank 104 by means of countersunk machine bolts 114 extending through the plank 104 and the leg 110 as shown, the machine bolts 114 being tightened to hold the plank 104 and the angle leg 110 in assembled relationship by means of nuts 116 threaded on the machine bolts 114.

An arcuate steel plate, which can simply be cut from a length of steel pipe of tubing, is indicated at 118, such arcuate steel plate 118 constituting a concave bearing member that opens downwardly and which is on its concave surface complemental to the external surface curvature of the axle 14. Such bearing member 118 is welded to the steel plate 106 as indicated at 120, and is additionally welded to the leg 108 of the angle as indicated at 122 so as to reinforce the connection between the plate 106 and the angle while fixing the position of the bearing member 118 in its relationship to the ramp 102. To further support and reinforce the free end or edge 124 of the plate 106 with respect to the bearing member 118, a reinforcing steel strap 126 extends between the free edge 126 and a free edge 128 of the bearing member 118 and is respectively welded thereto as indicated at 130 and 132.

From the foregoing description of the ramp 102 and its relationship to the axle 14, it will be seen that the ramp 102 is oscillatably (because of the sliding engagement between the bearing member 118 and the axle 14) supported on the axle 14 for oscillatory movement about the axis of the axle 14, and that such axis of oscillation is intermediate the longitudinal extent of the ramp 102 in an arrangement such that the upper surface of the ramp 102 projects for an interval forwardly of such axis, though, of course, the major extent of the ramp 102 extends rearwardly of such axis. As will be seen presently, such minor degree of projection of the ramp 102 forwardly of the axis of the axle 14 is important and results in a very important operating convenience insofar as utilization of the ramps 100 and 102 is concerned.

Such oscillatory support of the ramps 100 and 102 could, of course, be obtained upon the bearing member 118 being annular, that is, extending circumferentially entirely around the axle 14, and indeed such structure can be utilized if desired; however, it is much preferred that the angular extent of the bearing member 118 be not greater than 180°, whereby the ramp 102 can be readily disengaged from the axle 14. Such capability of the preferred arrangement enabling the ramps 100 and 102 to be disengaged from the axle 14 is much preferred for the reason that for purposes of shipment the ramps 100 and 102 can be simply disengaged and lashed in position between the axles 12 and 14 overlying the structural members 24, 36, 38 and 26 as will be appreciated. Furthermore, such disengagement of the ramps 100 and 102 enables their being most conveniently repositioned selectively at other locations along the longitudinal extent of the axle 14 to enjoy the benefits of adjustable spacing between the ramps 100 and 102, it being noted that the frame members 24 and 26 do not preclude such adjustments when it is desired to position the ramps 100 and 102 at a closer spacing than the spacing between the members 24 and 26 rather than in the positions shown thereof in FIGURE 1. Also, as will be apparent, the capability of detachment avoids the trailing rear ends of the ramps 100 and 102 dragging upon the ground if the trailer 10 is to be towed in an unloaded condition.

Directing attention primarily to FIGURES 6 through 7, the reference numeral 140 designates generally a self-propelled wheeled vehicle which includes a frame 142 that is supported at its rear end by means of a swively mounted ground support wheel 144. The self-propelled wheeled vehicle or machine 140, which will be recognized by those familiar with the art as a conventional and widely known swather in much current use, includes forward, spaced power driven ground support or traction wheels 146 having a common axis of rotation 148. Only one of the two forward wheels 146 is visible in the drawing, it will be understood that such wheels are of the same size and have the same spacing as shown of the ramps 100 and 102 in FIGURES 1 and 3. With the trailer 10 including the ramps 100 and 102 thereof in the positions shown in FIGURES 1 and 3, the machine 140 can be driven from a position resting entirely upon the surface of the ground indicated at 150 to the position shown of the machine 140 shown in FIGURE 6, it being obvious that the wheels 146 are resting upon the ramps 100 and 102. Upon further advance of the machine 140 with the wheels 146 rolling forwardly along the ramps 100 and 102, the machine 140 reaches the position thereof relative to the trailer 10 shown in FIGURE 7, wherein the wheels 146 of the machine 140 have passed forwardly in their contact with the ramps 100 and 102 of a position directly overlying the axis of the axle 14 so that the weight of the machine 140 carried by the wheels 146 is applied against the ramps 100 and 102 in such a manner as to oppose the bending moment due to the weight of the portions of the ramps extending rearwardly of the oscillatory axis with the result that the ramps 100 and 102 are caused to rock or oscillate in an anticlockwise direction as seen in FIGURE 7 to cause movement of the ramps from the position shown thereof in dashed outline in FIGURE 7 to the full line position shown thereof in FIGURE 7. In other words, as the machine 140 closely approaches what is herein termed its transport position with respect to the trailer 10, the rear ends of the ramps 100 and 102 are raised from the ground surface 150.

Upon slight additional forward advance of the machine 140 relative to the trailer 10 from the positions occupied in FIGURE 7, the wheels 146 move downwardly to be nested downwardly between the axles 12 and 14 to an extent determined by the spacing of such axles relative to the diameter of the wheels 146, and so as to be supported by such axles 12 and 14. Such nested position of the wheels 146 between the axles 12 and 14 so as to be supported by the latter is best appreciated upon reference to FIGURE 8, and it will be noted in this regard that the spacing of the axles 12 and 14 in effect constitute a seat conformable to a downwardly convex arc, which in this case is the arc 160 defined by the arcuate periphery 160 of the wheels 146 between the axles 12 and 14.

In this regard, it will be observed that except to the extent such continuity is interrupted by the frame elements 24, 36, 38 and 26 such seat as defined by the space intermediate the axles 12 and 14 is continuous along the entire extent of the shorter axle 12. Such interruptions of continuity of such seat occasioned by the frame members 24, 36, 38 and 26 is of no real hardship inasmuch as the positions occupied by such frame members can be made such as to not interfere with the seating of previously known spacings of wheels such as those 146 of the machine 140. To the extent that such may actually be a possible hardship or in the event that wheel spacings to be encountered may be unknown, it is though obvious in view of the foregoing that the frame members 24, 36, 38 and 26 can be contoured to be compatible with any seating configuration likely to be encountered, and indeed all of such frame members can be of a U-shape.

FIGURE 8 illustrates very clearly the bearing engagement at 164 of the wheel 146 upon the marginal portion or edge 124 of the ramp 102 to cause the latter to assume the position shown thereof when the machine 140 is in the transport position.

From the foregoing, it will be seen that the operator of the machine 140 can simply drive the machine 140 up the ramps 100 and 102 to move the machine 140 into the transport position and that upon the machine 140 approaching and reaching the transport position causes the ramps 100 and 102 to be automatically raised or retracted from ground engaging position. It has been found upon making actual tests of a full scale working model of the illustrated form of the trailer 10 and the illustrated machine 140 that the ramps 100 and 102 remain quite secure in their elevated or retracted positions during rapid rates of towing the trailer 10 and the machine 140 over rough terrain. Such tests also indicated great stability insofar as the trailer 10 and the machine 140 retaining their relative positions during such tests, and it was found that it was not necessary to snub down or otherwise make any special provision to secure the machine 140 to the trailer 10; however, U-shaped loops of steel such as those indicated at 170 and 172 can be welded to the top sides of the axles 12 and 14 by means of which chains, or ropes (not shown) can be employed to snub down or tie the machine 140 to the axles 12 and 14 to positively secure the same in transport position.

It is to be particularly noted on reference to FIGURE 7 that when the machine 140 and the trailer 10 are in their relative transport position that the swively mounted ground support wheel 144 is still in engagement with the ground surface 150. Such ground engagement by the swively mounted support wheel 144 tends to stabilize the machine 140 and the trailer 10 in their transport condition, and it is to be observed that the swivel character of the mounting of the wheel 140 (such swivel mounting being indicated at 186) enables short radius turns to be made.

After the trailer 10 and the machine 140 mounted thereon in transport condition have been towed to a desired location of use of the machine 140, the operator of the machine 140 simply drives the power driven wheels 146 to cause rearward movement of such wheels over the ramps 100 and 102, and it will be evident in view of the preceding comments regarding the reverse operation that the ramps 100 and 102 are lowered or placed in their operative position such that the rear ends thereof engage the ground surface 150. Such lowering of the ramps 100 and 102 is, of course, entirely automatic as in the case of the retraction, and the assistance of a helper or even of any special attention by the operator of the machine 140 is entirely unnecessary.

Although, of course, it is not essential that the wheels to be seated between the axles 12 and 14 be power driven as in the case of the wheels 146 of the particular type of illustrated machine 140, it is, of course, important that some form of motive power be available to force such necessary progress of the wheels along the ramps 100 and 102 to be available in loading the trailer 10, and also in unloading the trailer so as to enable movement of the wheels from their seats. It is thought that provision of such necessary force can be easily accomplished by the user, and so no special means are herein disclosed therefor.

It will be clear to those conversant to only a modest extent with the class of subject matter here involved that the attainable length of the seat defined by the spacing of the axles 12 and 14 enables the trailer 10 to be employed in conjunction wheeled vehicles of the sort having either extraordinarily wide tires or employing dual wheels, with appropriate modification in the configuration or placement of the frame members 24, 36, 38 and 26 as may be necessary. For example, certain extant swathers or wind rowers as well as conventional trucks employ pairs of dual mounted wheels with the wheels of each pair mounted to rotate in unison. The loading of four such driving wheels having a common axis aboard the trailer 10 will present no particular problem, and it will be noted that the transverse width of the ramps 100 and 102 need not be as great as the spacing between dual wheels mounted on a single axle to rotate in unison.

It was assumed during the preceding discussions regarding loading and unloading the machine 140 on the trailer 10 that the tongue 60 was attached to a towing vehicle, though such is not necessary except only as a means to prevent any forward or rearward movement of the trailer 10 during such operation. It will be appreciated that the rotatable axle 12 considerably simplifies the attachment or assembly of the tongue 60 in such a manner that the tongue construction 60 can be allowed to rest on the ground, be raised for connection to a towing vehicle, or to compensate for the movement of a towing vehicle as well as the trailer 10 over uneven terrain. In this connection, it will be appreciated that the tongue construction 60 can be readily moved from the full line position shown thereof in FIGURE 2 to the raised position shown thereof in dashed outline as such movement is easily permitted by the axle 12 being journaled through the bearings 40, 42, 44 and 46.

As it will be understood that since the rotatable mounting of the wheels 16 through 22 is standard and conventional that it will not be necessary for the manufacturer of the trailer 10 to include provision of such wheels and the mountings therefor in the structure shipped by him to distribution outlets. It will therefore be seen that the trailer 10, less the wheels 16 through 22, can be shipped as a very compact unit and yet involve very little effort at the receiving end of the line to reassemble and place the same in operative condition. For such shipment, the tongue construction 60 is detached from the axle 12, collapsed and placed along with the ramps 100 and 102 intermediate the axles 12 and 14, and such parts sufficiently secured for shipment. The recipient of the shipment simply attaches the tongue construction 60, acquires from some other source and attaches the wheels 16 through 22 for rotation upon the axles 12 and 14, and rests the ramps 100 and 102 upon the axle 14.

It will be amply apparent that the illustrated and described embodiment of the invention is susceptible to numerous variations and modifications without departing from the spirit of the invention, and accordingly, attention is directed to the appended claims in order to ascertain the actual scope of invention.

I claim:

1. For use in a wheeled vehicle, the improvement comprising front and rear spaced and parallel axles each adapted for the mounting of rotatable ground support wheels at their free ends, means connecting the axles for retaining the axles in fixed spatial relationship to each other, said front axle being journaled for rotation through said last means, a forwardly extending tongue secured to the front axle, the arrangement being such that the raising and lowering of the forward end of the tongue oscillates the front axle, said tongue including an elongated central member having forward and rear ends and a pair of elongated lateral members on opposite sides of the central member and each having forward and rear ends, said members being coplanar with the forward ends of the lateral members being pivotally connected to the central member adjacent the forward end of the latter whereby the lateral members can be swung from collapsed tongue position wherein they are substantially parallel to the central member to an operative tongue position wherein the lateral members are oppositely inclined to the central member with the rear ends of the lateral members being substantially spaced laterally of the central member, and cooperating means fixed to the rear ends of the members and fixed at spaced positions to the front axle for releasably securing the tongue to the front axle while maintaining the tongue in operative position while so secured.

2. In combination, a wheeled vehicle and a transport trailer therefor, said wheeled vehicle comprising a frame supported by a pair of spaced power driven front ground wheels and a rear, swivelly mounted ground wheel, said transport trailer comprising elongated and parallel front and rear axles each having a pair of ground wheels rotatably mounted at its opposite ends, a forwardly extending towing tongue connected to the front axle, said axles being spaced an interval less than the diameter of the power driven ground wheels, and a pair of elongated ramps extending rearwardly of the rear axle with means intermediate the longitudinal extent of each of said ramps oscillatably supporting such ramp upon the rear axle for oscillation about the rear axle as an axis, whereby the wheeled vehicle can be driven forwardly with the power driven ground wheels advancing upon the ramps to a transport position of the wheeled vehicle wherein the power driven ground wheels overlie the space intermediate the axles and nestle downwardly between the axles to an extent limited by the spacing of the latter, with such wheels bearing downwardly against the ramps forwardly of the rear axle to hold the ramps rearwardly of the rear axle in a raised position, and wherein the swiveled ground wheel is disposed substantially rearwardly of the rear axle, with the result that the weight of the wheeled vehicle is carried by the swiveled wheel and the wheels of the transport trailer.

3. The combination of claim 2, wherein said means for oscillatably supporting a ramp upon the rear axle comprises a downwardly facing concave member in sliding and partially embracing engagement with the rear axle, whereby the ramp may be removed from the rear axle.

4. The combination of claim 2, wherein the wheels of the trailer have a diameter greater than the spacing of the axles and less than the diameter of the power driven wheels of the wheeled machine, and one of said axles being of lesser length than the other, the arrangement being such that the wheels of said one axle radially overlap and are disposed between the wheels of the other axle.

5. The combination of claim 2, wherein said rear axle has fixed thereto spaced, forwardly extending frame members each carrying at its forward end a hollow sleeve bearing, said front axle being rotatably received through the sleeve bearings, and wherein means is included to nonrotatably secure the tongue to the front axle at spaced positions along the latter.

6. The combination of claim 5, wherein the last recited means releasably secures the tongue and the front axle.

7. A transport trailer comprising elongated, parallelly spaced front and rear axles one of which is shorter than the other, whereby such axles are adapted to have rotatably mounted upon their ends wheels of a diameter greater than the spacing of the axles, a pair of spaced, forwardly extending frame members fixed to the rear axle with each of such members being provided with a hollow sleeve bearing at its forward end, said front axle being journaled for rotation in said bearings, a forwardly extending towing tongue fixed to the front axle, the arrangement being such that oscillation of the front axle in the sleeve bearings is accompanied by raising and lowering of the tongue, and ramp means mounted on the rear axle for enabling a wheeled vehicle to be moved into a position resting wheels thereof on the axles.

8. For use in a wheeled vehicle of the type that is employed to transport a wheeled machine, the improvement comprising means defining a pair of horizontally spaced seats that are each at least in part compatible with downwardly convex arcs and adapted to receive supportingly thereon a pair of ground wheels of a machine to be transported, a pair of parallel ramps with said ramps being oscillatably mounted for oscillation about aligned horizontal axes respectively disposed immediately adjacent the seats and above the lowermost extent of said arcs, each of said ramps extending away from its horizontal axis and the seat immediately adjacent thereto and terminating in a free end that is movable on oscillation of the ramp from a ground engaging position in which the ramp is downwardly inclined to an elevated position, ramp raising means fixed to each ramp and comprising an extension thereof projecting above the seat into said arc and responsive to a ground wheel being supportingly received in such seat to oscillate the ramp and move the free end of the latter from said ground engaging position to said elevated position, whereby the ground wheels of a machine to be transported can be rolled up the ramps and over the axes associated therewith to engage operatively the ramp raising means on movement of the ground wheels downwardly into the seats to raise the free ends of the ramps from their ground engaging positions to their elevated positions, each of said seats being partially defined at a position having a height greater than the lowermost part of said arc by an elongated member having in transverse section an arcuate top bearing surface, and said oscillatable mounting of the ramp including the ramp having fixed thereto downwardly facing concave bearing member of less than 180 degrees extent that is complementary to and in bearing engagement with said top bearing surface, the arrangement being such that each of the ramps is oscillatably supported on the member and is also detachable from said member.

9. The combination of claim 8, wherein each of said ramps is movable along the length of the elongated member on which it is oscillatably supported, whereby the ramps can be selectively positioned to adjust the spacing therebetween.

10. A transport trailer comprising elongated, parallelly spaced front and rear axles one of which is shorter than the other, whereby such axles are adapted to have rotatably mounted upon their ends wheels of a diameter greater than the spacing of the axles, a pair of spaced, forwardly extending frame members fixed to the rear axle with each of such members being provided with a hollow sleeve bearing at its forward end, said front axle being journaled for rotation in said bearings, a forwardly extending towing tongue fixed to the front axle, the arrangement being such that oscillation of the front axle in the sleeve bearings is accompanied by raising and lowering of the tongue, and a pair of elongated ramps, and each of said ramps being provided intermediate its longitudinal extent with means for oscillatingly supporting such ramp upon the rear axle.

11. A transport trailer comprising elongated, parallelly spaced front and rear axles one of which is shorter than the other, whereby such axles are adapted to have rotatably mounted upon their ends wheels of a diameter greater than the spacing of the axles, a forwardly extending tongue secured to the front axle, means enabling vertical oscillation of the tongue about the axis of the front axle, and a pair of elongated ramps, and each of said ramps being provided intermediate its longitudinal extent with means for oscillatingly supporting such ramp upon the rear axle.

References Cited by the Examiner
UNITED STATES PATENTS

| | | | |
|---|---|---|---|
| 302,370 | 7/1884 | Wood | 180—22 |
| 1,222,989 | 4/1917 | Powell | 180—22 |
| 1,241,418 | 9/1917 | Mosher | 280—47.15 |
| 1,372,818 | 3/1921 | Jahnke | 280—491 X |
| 1,497,327 | 6/1924 | Childers | 180—22 |
| 1,784,576 | 12/1930 | Christiansen et al. | 280—491 X |
| 2,198,438 | 4/1940 | Knapp | 214—334 |
| 2,506,718 | 5/1950 | Grant | 280—476 |
| 2,541,582 | 2/1951 | Hawkins | 280—33.5 |
| 2,608,312 | 8/1952 | Day | 214—334 |
| 2,628,733 | 2/1953 | Hale | 214—506 |
| 2,943,863 | 7/1960 | Corey et al. | 280—79.1 |
| 2,971,769 | 2/1961 | Gaddis | 280—79.1 |

References Cited by the Applicant
UNITED STATES PATENTS

| | | |
|---|---|---|
| 2,058,691 | 10/1936 | Holsten et al. |
| 2,391,503 | 12/1945 | Page. |
| 2,491,318 | 12/1949 | Knapp. |
| 2,639,926 | 5/1953 | Parks. |
| 2,661,856 | 12/1953 | Stanley et al. |
| 2,776,063 | 1/1957 | Larson. |
| 3,066,946 | 12/1962 | Nelson. |

HUGO O. SCHULZ, *Primary Examiner.*